United States Patent [19]

Zimmer

[11] 4,350,498
[45] Sep. 21, 1982

[54] DAMPENING AGENT FOR RESIN BONDED GRINDING WHEELS

[75] Inventor: William F. Zimmer, Paxton, Mass.

[73] Assignee: Norton Company, Worcester, Mass.

[21] Appl. No.: 219,710

[22] Filed: Dec. 24, 1980

[51] Int. Cl.³ .............................................. C08K 5/05
[52] U.S. Cl. ...................................... 51/298; 51/304; 51/306
[58] Field of Search ........................... 51/298, 306, 304

[56] References Cited

U.S. PATENT DOCUMENTS

| | | | |
|---|---|---|---|
| 1,537,454 | 5/1925 | Brock | 51/298 |
| 1,893,117 | 1/1933 | Webster et al. | 51/298 |
| 1,924,748 | 8/1933 | Novotny et al. | 51/298 |
| 2,814,554 | 11/1957 | Rose | 51/298 |
| 2,825,638 | 3/1958 | Booth | 51/298 |
| 2,943,926 | 7/1960 | Goepfert | 51/298 |
| 3,784,365 | 1/1974 | Caserta et al. | 51/298 |
| 3,888,640 | 6/1975 | Bigorajski | 51/298 |

FOREIGN PATENT DOCUMENTS

| | | | |
|---|---|---|---|
| 693810 | 9/1964 | Canada | 51/298 |
| 576837 | 4/1946 | United Kingdom | 51/298 |
| 577020 | 5/1946 | United Kingdom | 51/298 |

*Primary Examiner*—James H. Derrington
*Attorney, Agent, or Firm*—Arthur A. Loiselle, Jr.

[57] ABSTRACT

The present invention relates to abrasive articles such as grinding wheels which employ organic binders and are improved by the use of certain oils or with the use of long chain aliphalic monhydroxy alcohols or long chain alkylated phenols alone or mixed with particular oils as dust depressants or dampening agents used with the conventional plasticizers. These dampening agents prevent "balling", minimize dusting and produce a more durable abrasive article.

5 Claims, No Drawings

DAMPENING AGENT FOR RESIN BONDED GRINDING WHEELS

TECHNICAL FIELD

The invention relates to resin bonded grinding wheels and a method for their manufacture. More specifically the invention relates to dampening agents or dust depressants used in the preparation of grinding wheel mixes.

BACKGROUND ART

Prior Art Statement

The following U.S. Letters Patent are representative of the most relevant prior art known to the Applicant at the time of filing the application:

| | | |
|---|---|---|
| 1,537,454 | May 12, 1925 | F. P Brock |
| 1,893,117 | January 3, 1933 | D. E. Webster et al |
| 1,924,748 | August 29, 1933 | E. E. Novotny et al |
| 2,814,554 | November 26, 1957 | R. A. Rose |
| 2,825,638 | March 4, 1958 | A. C. Booth |
| 2,943,926 | July 5, 1960 | G. J. Goepfert |
| 3,784,365 | January 8, 1974 | R. T. Caserta et al |

U.S. Pat. No. 1,537,454 teaches the use of furfural as a solvent, plasticizer and supplemental hardener for phenolic binders for abrasive grains used in preparing grinding wheels. A few drops of creosote oil, phenol, or cresol are optionally used.

U.S. Pat. No. 1,893,117 describes the problem associated with the use of the highly reactive furfural, namely the agglomeration of the dry resin particles intended to coat the abrasive particles, referred to as "balling". A solution is presented in the use of Kolineum (TM Allied Chemical Corp.) which is a neutral anthracene oil coal tar fraction composed almost entirely of aromatic compounds. The process is a two-step one; first mixing the abrasive grains and resinoid powder with Kolineum and then adding the furfural.

U.S. Pat. No. 1,924,748 teaches the use of furfuryl alcohol or benzyl alcohol in place of furfuryl alcohol.

U.S. Pat. No. 2,814,554 provides a conventional example of using furfural in producing grinding wheels, and also shows the addition of anthracene oil as an anti dust agent after the abrasive grain and resin bond mix has been completely processed.

U.S. Pat. No. 2,825,638 shows employing a liquid rubber copolymer co-mingled with furfural that is used to wet an abrasive and phenolic mix to which cresol or creosote oil or guaicol is added in the mixer as a "pick-up agent" for the resin particles which have failed to attach themselves to the abrasive particles wetted with furfural in liquid rubber. It is stated that the "liquid pick-up agent" prevents balling.

U.S. Pat. No. 2,943,926 states that furfural is used with cresylic acid to form an initial coating of resin bond on the abrasive grains used to make a grinding wheel. A final step may include treating the resin coated grains with creosote oil and liquid resin, molding a wheel with the resulting mix and then curing the resin bond.

U.S. Pat. No. 3,784,365 shows the addition of fully chlorinated hydrocarbons to resinoid bond grinding wheels in addition to furfural and creosote oil.

Despite the many suggestions offered by the prior art for more efficiently mixing abrasive grains with powdered resin bond materials, the problems of balling and excessive dustiness still persist.

Prior art attempts to cure dustiness caused by the excess of dry resin powder which fails to adhere to the wetted abrasive particles have not been wholly satisfactory. The various reagents suggested in the prior art as dust depressants or pick-up agents introduce undesirable properties in the ultimate product such as the loss of uniformity reflected in lack of durability. Kolineum or creosote oil is a common agent for depressing dust, but in the amount needed to be effective, it is expensive and also introduces more oil into the abrasive than is desirable which degrades the grinding properties of the wheels. Phenol, cresol, etc., are too reactive to be satisfactory.

Another common problem is "balling", the tendency of the coated grains of abrasive particles to aggregate and form lumps when admixed with the resin. Balling is detrimental to the production of a mix having the desired uniformity of the grains in the resinoid bond material. Furfuryl alcohol has been suggested as an additive to prevent balling. However, furfuryl alcohol is a strong solvent, very reactive and easily polymerizes. Cresol, xylol, glycols, etc., which have also been suggested for this purpose and are also too reactive. Multi-step processing has also been employed to minimize balling, but this is time-consuming and expensive.

DISCLOSURE OF THE INVENTION

The present invention solves the problems of dusting and balling with the incorporation in the resinoid bond mixture of a relatively inexpensive wetting agent which is effective in small amounts, is non-reactive and non-solvating at room temperature and additionally, is suitable for one-step or multi-step processing. Surprisingly, grinding wheels made with a resinoid bond and the wetting agent of the present invention are improved by way of a shift in grinding grade toward greater durability, a significant advantage in resinoid wheel technology.

The preferred wetting agent is a long chain aliphatic monohydroxy alcohol or a monohydroxybenzene (phenol) substituted by a long carbon chain. The alcohol or phenol may be admixed with certain non-reactive, non-solvating oils of defined viscosity.

The abrasive articles are produced with conventional thermosetting resins, conventional abrasive grains, fillers and plasticizers. The processing techniques are conventional and result in the production of all types of abrasive articles, hot-pressed wheels, cold-press wheels, cut-off, snagging, precision and resinoid diamond wheels, etc.

This invention provides a range of additives for use during the mixing of the abrasive grains with the powdered resin bond material. One, or a mixture of the oils and alcohols used as here taught may be added to the mix of abrasive grains and resin for the purpose of suppressing dust formation during the preliminary mixing step and then during the cure, the presence of these substances induce better flow of the bond. In any event, since smaller quantities of the presently described dust suppressants can be used to obtain the desired result, cost savings can be realized and the use of the smaller quantity of additive minimizes possible interference with the resin bond and grain as sometimes has been observed when an excessive quantity of anthracene oil has been used.

The preferred wetting agents suggested for use in following this invention are aliphatic monohydroxy alcohols having a carbon skeleton of 6 to 18 carbon atoms. They may be primary, secondary or tertiary alcohols. Straight chain or lightly branched aliphatic chains are preferred. Greater branching is less desirable because this results in a higher volatility for a given molecular weight, and it also produces greater tendency to solvate the resin. Chain lengths less than 6 carbons are unsatisfactory due to their volatility and chain lengths greater than 18 carbon atoms are solid alcohols and difficult to solubilize with other alcohols suitable for the invention. The wetting agent must be a liquid for use as a wetting agent and mixtures of higher and lower molecular weight alcohols satisfy this criterion.

Compounds which cause excessive room temperature solvation of the powdered resin are to be avoided. Such compounds are glycols, polyols, carboxylic acids and esters, aldehydes, ketones, ethers and various di and poly functional oxygen compounds. No other functional groups except the hydroxyl are present in the wetting agents of this invention.

Representative alcohols are n-hexyl alcohol, n-heptyl alcohol, lauryl alcohol, n-octyl alcohol, capryl alcohol, n-nonyl alcohol, n-decyl alcohol, myristyl alcohol, cetyl alcohol, stearyl alcohol, etc. Preferred are 2-ethyl hexanol, decyl alcohol, dodecyl alcohol, tridecyl alcohol, octadecyl alcohol and mixtures thereof. Mixtures are necessary in those instances in which one alcohol is a solid, generally those with carbon chain lengths greater than 12.

Monohydroxyl benzene, i.e. phenol, with aliphatic hydrocarbon chain substitutes are also suitable. Hydrocarbon chain lengths of 6 to 18 carbon lengths are operable. The substituents are preferably para. Other substituents on the phenol besides alkyl groups are not within the scope of the invention. Exemplary phenols are p-n-decyl phenol; p-n-dodecyl phenol; n-octadecyl-phenol and other chain lengths as shown above for the aliphatic alcohols.

The oil additive suitable for the invention is a liquid product of plant or petroleum origin within the viscosity range of products commonly called oils. The use of any oil outside of the scope of the parameters defined herein, whether aliphatic hydrocarbon, animal or vegetable, although it may impart excellent dust free properties to resinoid bond and abrasive mixes, is undesirable in that such oils have an undesirable and variable effect on bond fluxing and/or result in cured products in which the oil has migrated to the surface causing oily, non-uniform wheel structures to be produced. Such substances interfere significantly with bond flow and may produce weaker abrasive products, e.g. wheels.

Moreover, while petroleum oils may have a great viscosity range, the oils suitable in the present invention are those which have a viscosity between 10 and 2000 cps. Additionally, the oils must have little, or preferably no solvating action on the resin mix at temperatures below about 45° C. The oil is tested with the resin before use to see if any solvation occurs. This is done by mixing the oil and resin and noting any rise in temperature and change in viscosity.

Mineral oils, aromatic hydrocarbon concentrates, naphthenic oils, diesel oil, terpenes, and limonenes are suitable types of oil, provided that the particular commercial source meets the above viscosity and non-solvation parameters. For example, Shell supplies suitable oils under the tradenames Dutrex, Clavus and Diala; Exxon provides 1502 and Nuso, and Mobile sells Certrex 39 and Provalent 4A.

Kolineum has a viscosity of 18 cps and when used in quantities to fully control dusting, tends to solvate the resin at around room temperature. Relatively, Kolineum is an expensive additive to use for this purpose.

Mixtures of alcohol with oil are possible and desirable, particularly if the alcohol is a solid. If two alcohols are mixed, it is sufficient that the resultant mixture is a liquid. If the alcohol or alcohols are mixed with oil, ratios by weight of alcohol to oil should be 100:0 to 0:100.

The amount of wetting agent, alcohol or alcohol-oil mixture or oil is between 0:1 and up to 10% by weight of the resin.

The resin may be phenolic based such as phenol-aldehyde, resorcinol aldehyde, cresolaldehyde, urea aldehyde, melamine formaldehyde, etc. Other conventional resins may be also used such as epoxy, shellac, saturated polyester, polyimide, unsaturated polyester, etc. and mixtures thereof.

The abrasives and fillers are conventional, examples of which are pyrites, cryolite, potassium fluoroborate, Saran (a copolymer of vinylidene chloride and vinyl chloride) potassium sulfate, zinc sulfide and barium sulfate, and the like.

The plasticizer may be furfural or liquid resin that is the same as the resin type employed in powdered form.

The components of the resinoid bond mix may be mixed following conventional procedures and the mix may be molded and fired in the conventional manner. The formulations are suitable for making hot-pressed and cold-pressed wheels; cut-off, snagging, precision and all types of abrasive articles. Patents noted in the prior art statement above show conventional processing in greater detail and these teachings are incorporated herein.

The wetting agent may be added to the bond, when the resin and fillers which make up the bond, are being blended. Alternatively, it can be added to the wheel mix in the mixing pan as the mix is being prepared for pressing. The wetting agent can be sprayed or otherwise distributed to the mix to be dispersed throughout the mass thereof.

The invention is further illustrated by the following examples in which all parts and percentages are by weight unless otherwise indicated. These examples are illustrative of the preferred embodiments designed to teach those skilled in the art how to practice the invention and represent the best mode contemplated for carrying out the invention.

EXAMPLES OF THE PREFERRED EMBODIMENTS

EXAMPLE 1

Wheels of this test were made in the conventional manner with and without creosote oil using 24 grit aluminum oxide abrasive, the abrasive mix included, abrasive 36.19 lb, furfural 139 cc, two stage phenol formaldehyde resin 9.29 lb, 14.52 filler, and creosote oil (15 cc/lb of resin). Four hot pressed cut-off wheels were made, two with the normal 15 cc/lb of creosote oil to dry resin and two wheels without creosote oil. Two cut-off tests were run and the wheels without creosote oil gave a 17% and 27% higher G ratio than the wheels which contained creosote oil.

EXAMPLE 2

An additional set of hot-pressed cut-off wheels was made essentially the same as those of Example I, except that in this set half the number of wheels contained no dampening agent, while in the other half 10 cc of decyl alcohol per pound of dry resin was utilized as the dampening agent. These two groups of wheels were subjected to the same cut-off tests as the wheels of Example I. The wheels containing the decyl alcohol dampening agent exhibited a G-ratio 27 to 29% greater than the wheels in which no dampening agent was used.

EXAMPLE 3

Cut-off wheels of the cold pressed type were made to compare the effect of decyl alcohol versus creosote oil dampening agents. These wheels had a weight percent composition of 74.4% fused $Al_2O_3$ abrasive, 2.3% liquid phenol formaldehyde resin, 10.7% powdered phenol-formaldehyde resin bond with 12.6% filler. To the bond of one set of wheels was added 20 cc of decyl alcohol per pound of dry resin, the resulting wheels volume % composition of about 52 abrasive, 34 bond and 14 pore. In cut-off tests on both 304 and 1018 steels, the decyl alcohol containing wheels out performed the creosote oil containing wheels by 16–18%.

EXAMPLE 4

Conventional phenolic resin bonded hot pressed snagging wheels 16∝ diameter, 2" thick with a 6" center hole were made using extruded and sintered bauxite abrasive. Wheels were made with a level of 20 cc alcohol/lb of dry resin for comparison with standard wheels made with creosote oil. These wheels were compared in a test grinding 304 stainless steel under a grinding force of 400 lbs. The wheels containing alcohol in the abrasive resin mix gave a 5% higher grinding ratio (with 4% less wheel wear) as compared with the standard wheel.

An informal laboratory evaluation test was devised for a quick comparative determination of the dust suppressing ability of certain of the respective alcohol and alcohol-oil mixtures discussed above. For this test, equal quantities of various powders or mixes were tumbled in a horizontally rotating one quart size can. The can was 4.75" in length and had a diameter of 4.25". The can had a $\frac{1}{2}$" diameter hole at the center of its bottom and top closure with a 20 mesh screen covering the hole in the bottom. The mix to be tested was placed in the container, the cover was applied and the can made to rotate about a horizontal axis on a suitable roller support at 60 rpm for one minute while two liters of air per minute were drawn through the interior of the can from the bottom hole to a suction means in the form of $\frac{1}{2}$" cylindrical hollow filter covering the end of a suction line inserted through the hole in the top of the can. The can and its contents were rotated. The filter was a 2" long section of glass tubing having a $\frac{3}{8}$" outer diameter and $\frac{1}{4}$" inside diameter. The tube had a piece of 20 mesh screen over one end and was stuffed with glass wool. The other end of the tube was adapted to be connected to an air pump to produce the desired two liters of air flow per minute and the air was sucked into the can, through the tumbling atmosphere produced by the rolling action and then through the filter to collect the dust produced in the filter.

Raw resin powder was tumbled and tests to measure its dustiness were made. Also, tests were made with the phenolic resin powder mix with creosote oil in various percentages, with decyl alcohol in various percentages, and with various percentages of a 75% decyl alcohol and 25% mixture with a hydrocarbon oil. The weight of the dust collected in the filters used with each of the resins was tabulated to give an approximation of the relative dust suppressing ability of each of the respective additives under the same conditions of agitation.

The data showing the weights recorded during the test runs was as follows:

| Raw Resin | Weights of Dust Accumulated 10% Creosote Oil (9T) | 6.66% Creosote Oil (6T) |
|---|---|---|
| .00328 | .00021 | .00062 |
| .00158 | .00017 | .00075 |
| .00214 | .00028 | .00093 |
| .00268 | Avg. - .00022 | Avg. - .00076 |
| .00205 | | |
| Avg. - .00234 | | |

| 3.33% Cresote Oil (3T) | 10% Decyl Alcohol | 5% Decyl Alcohol |
|---|---|---|
| .00126 | .00012 | .00056 |
| .00132 | .00011 | .00053 |
| .00140 | .00006 | .00044 |
| Avg. - .00133 | Avg. - .00010 | Avg. - .00051 |

| 7% Decyl Alcohol | 5%(75% Decyl Alcohol) (25% Mobil Certrex 39) |
|---|---|
| .00047 | .00039 |
| .00036 | .00030 |
| .00043 | .00038 |
| Avg. - .00042 | Avg. - .00036 |

| 8%(75% Decyl Alcohol) (25% Mobil Certrex 39) |
|---|
| .00010 |
| .00011 |
| .00008 |
| Avg. - .00010 |

| 4%(75% Decyl Alcohol) (25% Mobil Certrex 39) |
|---|
| .00043 |
| .00033 |
| .00035 |
| Avg. - .00037 |

A review of this data shows that in the raw resin powder run without any additive produced an average of 0.00234 grains of dust during the test run. When 10% creosote oil was added, the dust collected averaged 0.00022 grain, compared with a 10% addition of decyl alcohol where the average dust collection weighed only 0.00010 grain. Another close comparison is the 6.66% creosote oil that produced an average of 0.00076 grain of dust while 7% of decyl alcohol produced only 0.00042 grains and a 5% addition of a mixture that was 75% decyl alcohol and 25% Mobil Certrex 39 oil had an even better dust suppressing ability producing only 0.00036 grain from the same test.

It is apparent, on the basis of nearly equal additions of the alcohol and alcohol and oil dust suppressants compared with equal weights of creosote oil adddition to a powdered phenol formaldehyde resin in the simple laboratory procedure described above, that significantly less dusting occurs when at least certain of the alcohol and oil additives of this invention are used.

In another test, 16"×2"×6" snagging wheels were made by the conventional hot pressing procedure using 14 grit alumina-zirconia abrasive. Wheels were made with furfural as the pick-up agent and creosote oil and various other additives to control dust during mixing. The various wheels were used grinding 4140 steel billets that were 6"×6"×24" long, at a grinding force of 400 lbs., the wheels being driven at 9500 surface feet per minute for 15 minute increments until the wheel diameter was reduced by ¼".

The results of these tests against the standard heavy duty snagging wheel made with 40 cc of furfural and 20 cc of creosote oil were recorded as follows:

| Wheel Wear Rate | Cut Rate | G Ratio % | Variation |
|---|---|---|---|
| 100 | 100 | 100 | 40cc furf:20cc creosote oil |
| 97 | 91 | 94 | 40cc furf:20cc Saf-T-Sol |
| 77 | 84 | 109 | 40cc furf:20cc Decyl Alcohol |
| 58 | 75 | 129 | 40cc furf:10cc Decyl Alcohol |
| 48 | 75 | 156 | 40cc furf:5cc mineral oil |
| 92 | 91 | 98 | 40cc furf:5cc creosote oil |

The dust suppressing additives described above can be used to replace creosote oil in the fabrication of resin bonded grinding wheels. The preferred additives of this invention can be used in smaller quantities to obtain the necessary dust control, thus they are more economical in use and further, have been found to have an effect during the curing process that produces a wheel having more durability and which shows an improved grinding ratio.

Although the invention has been described in considerable detail with reference to certain preferred embodiments thereof, it will be understood that variations and modifications can be effected within the spirit and scope of the invention that may fall within the scope of the appended claims.

I claim:

1. A process of making a grinding wheel from a mixture including abrasive grains, fillers and an uncured powdered resin bond, comprising blending said mixture, dampening the mixture during the blending step with a dampening agent selected from the group consisting of monohydroxy aliphatic alcohol with a carbon chain length of 6 to 18 carbon atoms and phenol substituted with an alkyl chain of 6 to 18 carbon atoms; said agent being essentially a non-solvent for the resin at room temperature but which may become a solvent therefor at temperatures above about 45° C.; pressing the blended mixture into a wheel form; and curing the resin with heat above 45° C.

2. The process of claim 1 wherein the dampening agent is selected from the group consisting of n-decyl alcohol, n-dodecyl alcohol, 2-ethyl hexanol, tridecyl alcohol, octadecyl alcohol, p-n-decyl phenol, p-n-dodecyl phenol and p-n-octadecylphenol and mixtures thereof.

3. A resin bonded grinding wheel, comprising a molded mixture of abrasive, thermosetting resin, plasticizer and a dampening agent wherein said dampening agent is selected from the group consisting of n-decyl alcohol, n-dodecyl alcohol, 2-ethyl hexanol, tridecyl alcohol, octadecyl alcohol, p-n-decyl phenol, p-n-dodecyl phenol and p-n-octadecylphenol and mixtures thereof.

4. A mixture including abrasive grains, powered resin and a dampening agent adapted to be used for making cured resin bonded grinding wheels, comprising a measured quantity of abrasive grains; a measured quantity of powdered resin blended with said grains; and a liquid dampening agent selected from the group consisting of monohydroxy aliphatic alcohol with a carbon chain length of 6 to 18 carbon atoms and phenol substituted with an alkyl chain of 6 to 18 carbon atoms; said agent being essentially a non-solvent for the resin at room temperature but which may become a solvent therefor at temperatures above about 45° C.

5. A mixture including abrasive grains, powdered resin and a dampening agent adapted to be used for making cured resin bonded grinding wheels, comprising a measured quantity of abrasive grains; a measured quantity of powdered resin blended with said grains; and a liquid dampening agent selected from the group consisting of n-decyl alcohol, n-dodecyl alcohol, 2-ethyl hexanol, tridecyl alcohol, octadecyl alcohol, p-n-decyl phenol, p-n-dodecyl phenol and p-n-octadecylphenol and mixtures thereof; said agent being essentially a non-solvent for the resin at room temperature but which may become a solvent therefor at temperatures above about 45° C.

* * * * *